United States Patent
Leveille

(10) Patent No.: US 9,148,796 B2
(45) Date of Patent: Sep. 29, 2015

(54) RESILIENT ANTENNA DISTURBANCE DETECTOR

(71) Applicant: Ninve Jr. Inc., Nassau (BS)

(72) Inventor: Benoit Leveille, Saint-Placide (CA)

(73) Assignee: NINVE JR. INC., Nassau (BS)

( * ) Notice: Subject to any disclaimer, the term of this patent is extended or adjusted under 35 U.S.C. 154(b) by 98 days.

(21) Appl. No.: 13/713,509

(22) Filed: Dec. 13, 2012

(65) Prior Publication Data

US 2014/0170983 A1 Jun. 19, 2014

(51) Int. Cl.
- H04W 24/08 (2009.01)
- H04B 3/46 (2015.01)
- H04B 15/00 (2006.01)
- H04W 24/00 (2009.01)
- H04B 17/00 (2015.01)
- H04B 17/10 (2015.01)

(52) U.S. Cl.
CPC ............ H04W 24/00 (2013.01); H04B 17/00 (2013.01); H04B 17/103 (2015.01); H04B 17/0085 (2013.01)

(58) Field of Classification Search
CPC ... H04W 24/00; H04W 24/08; H04W 28/048; H04B 3/46; H04B 17/00; H04B 17/0007; H04B 15/00
USPC ........ 455/63.1, 66.1, 67.11, 67.13, 77, 550.1, 455/570, 562.1
See application file for complete search history.

(56) References Cited

U.S. PATENT DOCUMENTS

| | | | |
|---|---|---|---|
| 3,611,361 A | 10/1971 | Gallichotte et al. | |
| 3,757,315 A | 9/1973 | Birchfield et al. | |
| 3,870,957 A | 3/1975 | Straw | |
| 3,958,244 A | 5/1976 | Lee et al. | |
| 4,903,321 A | 2/1990 | Hall et al. | |
| 5,487,176 A | 1/1996 | Yoneyama | |
| 5,574,981 A | 11/1996 | Ahonen | |
| 5,841,393 A | 11/1998 | Saito et al. | |
| 6,114,955 A | 9/2000 | Brunius et al. | |
| 6,603,810 B1 * | 8/2003 | Bednekoff et al. | 375/228 |
| 6,741,640 B1 * | 5/2004 | Johnson | 375/219 |
| 6,810,239 B2 | 10/2004 | Riddle | |
| 7,215,241 B2 | 5/2007 | Ghazarian | |
| 7,298,396 B2 | 11/2007 | Brown et al. | |

(Continued)

FOREIGN PATENT DOCUMENTS

| | | |
|---|---|---|
| EP | 0729124 B1 | 7/1998 |
| GB | 2233803 A | 1/1991 |
| WO | 92/03744 A1 | 3/1992 |

*Primary Examiner* — Andrew Wendell
(74) *Attorney, Agent, or Firm* — J-TEK Law PLLC; Scott T. Wakeman; Jeffrey D. Tekanic

(57) ABSTRACT

A resilient antenna disturbance detector is provided. A signal generator generates an unclonable integrity test signal. The antenna reflects a signal in response to the integrity test signal. A comparator determines whether the reflected signal matches the integrity test signal and a controller signals the disturbance of the antenna to a monitoring device if the energy level of the reflected signal is greater than a predetermined threshold and the reflected signal matches the integrity test signal. The detector provides the advantage of preventing an external receiver and transmitter from predicting and transmitting the integrity test signal to the antenna to interfere with disturbance detection. Also provided is a security system with resilient antenna disturbance detection.

18 Claims, 3 Drawing Sheets

(56) References Cited

U.S. PATENT DOCUMENTS

| | | |
|---|---|---|
| 7,429,929 B2 | 9/2008 | Linger et al. |
| 7,525,420 B2 | 4/2009 | McKinney |
| 7,541,920 B2 | 6/2009 | Tambascio et al. |
| 7,589,615 B2 | 9/2009 | Keller, Jr. et al. |
| 7,786,924 B2 | 8/2010 | Tominaga |
| 7,792,502 B2 | 9/2010 | Baker |
| 7,925,220 B2 * | 4/2011 | Baker ................. 455/67.14 |
| 7,979,219 B2 * | 7/2011 | Yen et al. ................. 702/58 |
| 8,167,204 B2 | 5/2012 | Woodard et al. |
| 2003/0040279 A1 | 2/2003 | Ballweg |
| 2005/0124304 A1 | 6/2005 | Bendov |
| 2005/0275527 A1 | 12/2005 | Kates |
| 2009/0244397 A1 * | 10/2009 | Aoki et al. .............. 348/725 |
| 2010/0182914 A1 * | 7/2010 | DelRegno et al. ........... 370/249 |
| 2013/0093884 A1 * | 4/2013 | Miller et al. ............. 348/143 |
| 2013/0154887 A1 * | 6/2013 | Hein et al. ............... 343/703 |
| 2014/0111234 A1 * | 4/2014 | Laackmann et al. ....... 324/750.3 |

* cited by examiner

RESILIENT ANTENNA DISTURBANCE DETECTOR

TECHNICAL FIELD

The invention relates to the wireless communications industry, and more specifically, to antenna integrity.

BACKGROUND

U.S. Pat. No. 5,574,981 teaches a method and a device for supervising the condition of a receiving antenna by transmitting a measuring signal through a first measuring path, transmitting the same measuring signal to the antenna, directing the signal produced from the energy reflected by the antenna through a second measuring path, and comparing the magnitude or energy level of both signals to determine whether the antenna is faulty, thereby taking into consideration the properties of components shared by both paths over the period of transmission.

SUMMARY

Antenna disturbance detectors that exclusively rely on the aforementioned energy level are vulnerable to false triggers. Such detectors generate an oscillating radio frequency electric current, the integrity test signal, which is provided to a monitored antenna for radiation in the form of electromagnetic waves and reflection in the form of another oscillating radio frequency electric current, the reflected signal. A controller determines whether the reflected signal energy is greater than a predetermined threshold, in which case it signals a disturbance of the monitored antenna.

However, if the electromagnetic waves radiated by the antenna disturbance detector can be detected by an antenna of a false trigger generator and reproduced for transmission back to the monitored antenna, then the antenna disturbance detector can believe that the reproduced signal added to the internally reflected signal indicates disturbance of the monitored antenna. If the electromagnetic waves radiated by the monitored antenna are radio signals having a pulsed envelope at regular intervals, the false trigger generator can measure their characteristics, which correspond to the characteristics of the integrity test signal, and transmit a synchronized copy with sufficient signal strength to cause a false trigger of the antenna disturbance detector.

It is an object of the present invention to provide an antenna disturbance detector resilient to false triggers.

It was found that in an antenna disturbance detector that exclusively relies on whether the energy level of a signal reflected by a monitored antenna in response to an integrity test signal is greater than a predetermined threshold, the provision of a signal generator for attributing unpredictable detectable characteristics to the integrity test signal, of a comparator for determining whether the reflected signal matches the integrity test signal, and of a controller for signaling antenna disturbance only if the reflected signal also matches the integrity test signal provides the advantage of preventing an external receiver and transmitter from predicting and transmitting the integrity test signal to the antenna to interfere with disturbance detection.

It is also an object of the present invention to provide an antenna disturbance detection method resilient to false triggers.

It was found that in an antenna disturbance detection method that relies exclusively on whether the energy level of a signal reflected by a monitored antenna in response to an integrity test signal is greater than a predetermined threshold, the provision of the steps of attributing unpredictable detectable characteristics to the integrity test signal, of determining whether the reflected signal matches the integrity test signal, and of signaling a disturbance of the antenna to a monitoring device only if the reflected signal also matches the integrity test signal provides the advantage of preventing an external receiver and transmitter from predicting and transmitting the integrity test signal to the antenna to interfere with disturbance detection.

While antenna disturbance detection has a wide variety of applications, such detection is particularly useful for security systems having a control panel in wireless communication with at least one security sensor located within protected premises and, in some cases, a remote control or data entry keypad. In such systems, if the control panel antenna is subject to disturbance, no wireless communication can take place between the control panel and the aforementioned devices, thus preventing the security system from fulfilling its purpose and, in some cases, preventing remote access to the control panel.

An antenna disturbance detector for such security systems can be implemented by having a security sensor transmit a wireless heartbeat to be received by the monitored antenna, having a heartbeat monitor listen to the wireless heartbeats received by the monitored antenna, and having a scheduler for signaling a disturbance of the monitored antenna when a predetermined number of consecutively scheduled heartbeats fail to be received by the monitored antenna. However, such a detector drains the battery life of the security sensor and can be falsely triggered by a sensor malfunction.

Alternatively an antenna disturbance detector that exclusively relies on the energy level of reflected signals can be implemented for such security systems, but such a detector, as mentioned previously, is vulnerable to false triggers. A robber can position any one of the false trigger generators described herein above within the range of the monitored antenna 7 to falsely trigger the detector in a repeated manner, thus encouraging the user of the security system to disable the detector. The robber can subsequently show up at the protected premises disguised as a security system technician and discretely compromise the integrity of the monitored antenna 7, thus leaving the premises vulnerable to robbery.

It is also an object of the present invention to provide a security system with antenna disturbance detection resilient to false triggers.

It was found that in a security system having at least one security sensor located within protected premises for transmitting a wireless security signal, a control panel having an antenna for receiving the wireless security signal, and an antenna disturbance detector that exclusively relies on whether the energy level of a signal reflected by a monitored antenna in response to the integrity test signal is greater than a predetermined threshold, the provision of a signal generator for attributing unpredictable detectable characteristics to the integrity test signal, of a comparator for determining whether the reflected signal matches the integrity test signal, and of a controller for signaling antenna disturbance only if the reflected signal also matches the integrity test signal provides the advantage of a security system with an antenna disturbance detector that prevents an external receiver and transmitter from predicting and transmitting the integrity test signal to the antenna to interfere with disturbance detection.

It is also an object of the present invention to provide a method of operating a security system with antenna disturbance detection resilient to false triggers.

It was found that in a method of operating a security system with antenna disturbance detection that comprises the steps of transmitting a wireless security signal from a security sensor located within protected premises to an antenna connected to a control panel and of conducting antenna disturbance detection exclusively on the basis of whether the energy level of a signal reflected by the antenna in response to an integrity test signal is greater than a predetermined threshold, the provision of the steps of attributing unpredictable detectable characteristics to the integrity test signal, of determining whether the reflected signal matches the integrity test signal, and of signaling a disturbance of the antenna to a monitoring device only if the reflected signal also matches the integrity test signal provides the advantage of method of operating a security system with antenna disturbance detection that prevents an external receiver and transmitter from predicting and transmitting the integrity test signal to the antenna to interfere with disturbance detection.

In an aspect of the invention, there is provided an antenna disturbance detector for signaling a disturbance of an antenna to a monitoring device, the antenna for reflecting a signal in response to an integrity test signal, the antenna disturbance detector comprising a signal generator for generating the integrity test signal with unpredictable detectable characteristics, wherein an external receiver and transmitter cannot predict and transmit the integrity test signal to the antenna to interfere with disturbance detection; a comparator for determining whether the reflected signal matches the integrity test signal; and a controller for signaling the disturbance of the antenna to the monitoring device if the energy level of the reflected signal is greater than a predetermined threshold and the comparator determines that the reflected signal matches the integrity test signal.

In another aspect of the invention, there is provided an antenna disturbance detection method for signaling a disturbance of an antenna, the antenna for reflecting a signal in response to an integrity test signal, the method comprising generating the integrity test signal with unpredictable detectable characteristics, wherein an external receiver and transmitter cannot predict and transmit the integrity test signal to the antenna to interfere with disturbance detection; determining whether the reflected signal matches the integrity test signal; and signaling the disturbance of the antenna to the monitoring device if the energy level of the reflected signal is greater than a predetermined threshold and the reflected signal matches the integrity test signal.

In yet another aspect of the invention, there is provided a security system with antenna disturbance detection comprising at least one security sensor located within protected premises for transmitting a wireless security signal; a control panel having an antenna, the antenna for receiving the wireless security signal, the antenna for reflecting a signal in response to an integrity test signal; a signal generator for generating the integrity test signal with unpredictable detectable characteristics, wherein an external receiver and transmitter cannot predict and transmit the integrity test signal to the antenna to interfere with disturbance detection; a comparator for determining whether the reflected signal matches the integrity test signal; and a controller for signaling the disturbance of the antenna to the monitoring device if the energy level of the reflected signal is greater than a predetermined threshold and the comparator determines that the reflected signal matches the integrity test signal.

In yet another aspect of the invention, there is provided a method of operating a security system with antenna disturbance detection, the system comprising at least one security sensor located within protected premises and a control panel having an antenna for reflecting a signal in response to an integrity test signal, the method comprising transmitting a wireless security signal from the security sensor to the antenna; generating the integrity test signal with unpredictable detectable characteristics, wherein an external receiver and transmitter cannot predict and transmit the integrity test signal to the antenna to interfere with disturbance detection; determining whether the reflected signal matches the integrity test signal; and signaling the disturbance of the antenna to the monitoring device if the energy level of the reflected signal is greater than a predetermined threshold and the reflected signal matches the integrity test signal.

BRIEF DESCRIPTION OF THE DRAWINGS

The invention will be better understood by way of the following detailed description of embodiments of the invention with reference to the appended drawings, in which.

DETAILED DESCRIPTION

Figure 1:
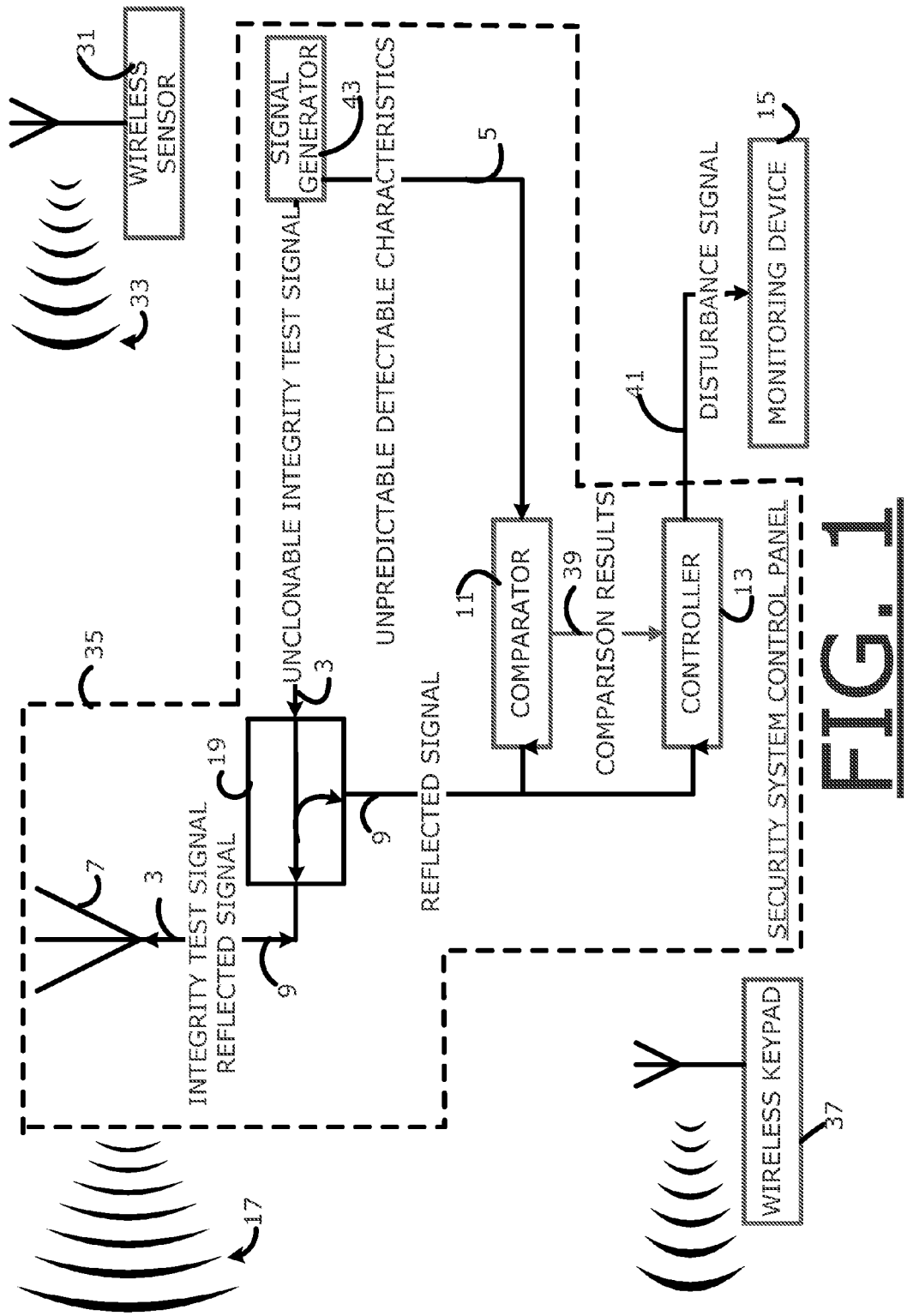
FIG. 1 is a block diagram of a resilient antenna disturbance detector according to a first embodiment of the invention.

The invention relates to the wireless communications industry, and more specifically, to antenna integrity. An antenna is an arrangement of aerial electrical conductors designed to transmit and receive electromagnetic waves. When provided with an oscillating radio frequency electric current, it radiates a majority of the current's energy in the form of electromagnetic waves and reflects a minority in the form of another oscillating radio frequency electric current, also known as a reflected signal. However, if its integrity is compromised from, for instance, a severing or masking of its conductors, the energy distribution is reversed: a majority of the provided current's energy is reflected while a minority is radiated. As a result, the energy level of a reflected signal can be indicative of antenna disturbance.

It was discovered that antenna disturbance detectors that exclusively rely on the aforementioned energy level are vulnerable to false triggers. Such detectors generate an oscillating radio frequency electric current, the integrity test signal, which is provided to a monitored antenna for radiation in the form of electromagnetic waves and reflection in the form of another oscillating radio frequency electric current, the reflected signal. A controller determines whether the reflected signal energy is greater than a predetermined threshold, in which case it signals a disturbance of the monitored antenna.

If the radiated electromagnetic waves can be detected by an antenna of a false trigger generator and reproduced for radiation back to the monitored antenna, then the antenna disturbance detector can believe that the reproduced signal added to the internally reflected signal indicates a disturbance of the monitored antenna. Such an integrity test signal is said to be clonable as an electromagnetic wave can be radiated to the monitored antenna to produce a reflected signal undistinguishable to the antenna disturbance detector from one produced in response to the integrity test signal.

Also, if the electromagnetic waves radiated by the monitored antenna are radio signals having a pulsed envelope at regular intervals, the false trigger generator can measure their characteristics, which correspond to the characteristics of the integrity test signal, and transmit a synchronized copy with sufficient signal strength to cause a false trigger of the antenna disturbance detector. Such an integrity test signal is also said to be clonable as an electromagnetic wave can be radiated to the monitored antenna to produce a reflected signal undistinguishable to the antenna disturbance detector from one produced in response to the integrity test signal.

In both cases, such false detection, when repeated, not only inconveniences the user, but also hinders the perceived reliability of the detector, which can lead the user to disable detection and expose the antenna to undetected disturbance. It is an object of the invention to provide an antenna disturbance detector and detection method resilient to false triggers.

Referring to FIG. 1, there is illustrated an antenna disturbance detector resilient to false triggers. A signal generator 43 generates an unclonable integrity test signal 3 in the form of an oscillating radio frequency electric current having unpredictable detectable characteristics 5 such as an encoding of a random or pseudorandom bit stream. A monitored antenna 7 reflects a signal 9 in response to the unclonable integrity test signal 3. A comparator 11 determines whether the reflected signal 9 matches the unclonable integrity test signal 3 as a function of the unpredictable detectable characteristics 5 and provides comparison results 39 to a controller 13, which verifies whether the energy level of the reflected signal 9 is greater than a predetermined threshold. The comparator 11 can use the characteristics 5 or directly the integrity test signal 3 to compare to the reflected signal 9, depending on the configuration of the comparator 11. The controller 13 signals a disturbance of the monitored antenna 7 to a monitoring device 15 only if the reflected signal 9 matches the unclonable integrity test signal 3 and the energy level of the reflected signal 9 is greater than the predetermined threshold.

The unclonable nature of the unclonable integrity test signal 3 is attributable to the unpredictable and ephemeral nature of the unpredictable detectable characteristics 5. The unpredictable nature of the unpredictable detectable characteristics 5 prevents the false trigger generator from preparing an electromagnetic wave having the unpredictable detectable characteristics 5 in advance, and radiating the prepared wave as soon as the electromagnetic waves 17 are detected, thereby producing the reflected signal 9 that would present an energy level greater than the predetermined threshold, that would present the unpredictable detectable characteristics 5, and that would reach the comparator 11 on time for a match to be established with the unclonable integrity test signal 3.

Instead, the unpredictable nature forces the false trigger generator to incur a false trigger delay between the detection of the electromagnetic wave 17 and the radiation of an electromagnetic wave having the unpredictable detectable characteristics 5, which false trigger delay is necessary for the false trigger generator to measure the unpredictable detectable characteristics 5 and produce the corresponding electromagnetic wave. The false trigger delay prevents the reflected signal 9 from reaching the comparator 11 before the unpredictable detectable characteristics 5 measured by the false trigger generator cease to be used by the comparator 11 to determine whether the reflected signal 9 matches the unclonable integrity test signal 3. The ephemeral nature of the unpredictable detectable characteristics 5 refers to the duration of time following the radiation of the electromagnetic waves 17 during which the unpredictable detectable characteristics 5 of the electromagnetic waves 17 are used by the comparator 11 to determine whether the reflected signal 9 matches the unclonable integrity test signal 3.

In an environment devoid of false triggers, if the integrity of the monitored antenna 7 is preserved, the energy level of the reflected signal 9 is smaller than the predetermined threshold and the controller 13 withholds from signalling a disturbance of the monitored antenna 7 to the monitoring device 15. Conversely, if the integrity of the monitored antenna 7 is compromised, both detection requirements are met: the energy level of the reflected signal 9 is greater than the predetermined threshold and the reflected signal 9 matches the unclonable integrity test signal 3. As a result, the controller 13 signals a disturbance of the monitored antenna 7 to the monitoring device 15.

In the presence of false triggers, if the integrity of the monitored antenna 7 is compromised, both detection requirements are met: the energy level of the reflected signal 9 is greater than the predetermined threshold and the reflected signal 9 matches the unclonable integrity test signal 3. As a result, the controller 13 rightly signals a disturbance of the monitored antenna 7 to the monitoring device 15. Conversely, if the integrity of the monitored antenna 7 is preserved, while the reflected signal 9 attributable to the false triggers can present an energy level greater than the predetermined threshold, it fails to match the unclonable integrity test signal 3 as its detectable characteristics fail to match the unpredictable detectable characteristics 5. Since at least one of both detection requirements is not met, the controller 13 withholds from signalling a disturbance of the monitored antenna 7 to the monitoring device 15.

As can be appreciated from the foregoing scenarios, in an antenna disturbance detector that exclusively relies on whether the energy level of the reflected signal 9 is greater than the predetermined threshold, the provision of the signal generator 43 for assigning an unpredictable identifier to the unclonable integrity test signal 3 in the form of detectable characteristics 5, of the comparator 11 for verifying whether the reflected signal 9 is attributable to the unclonable integrity test signal 3 by comparing their identifiers, and of the controller 13 for signaling a disturbance of the monitored antenna 7 to the monitoring device 15 exclusively on the basis of the energy level of the reflected signal 9 attributable to the unclonable integrity test signal 3 provides the advantage of resilience to false triggers.

Figure 2:
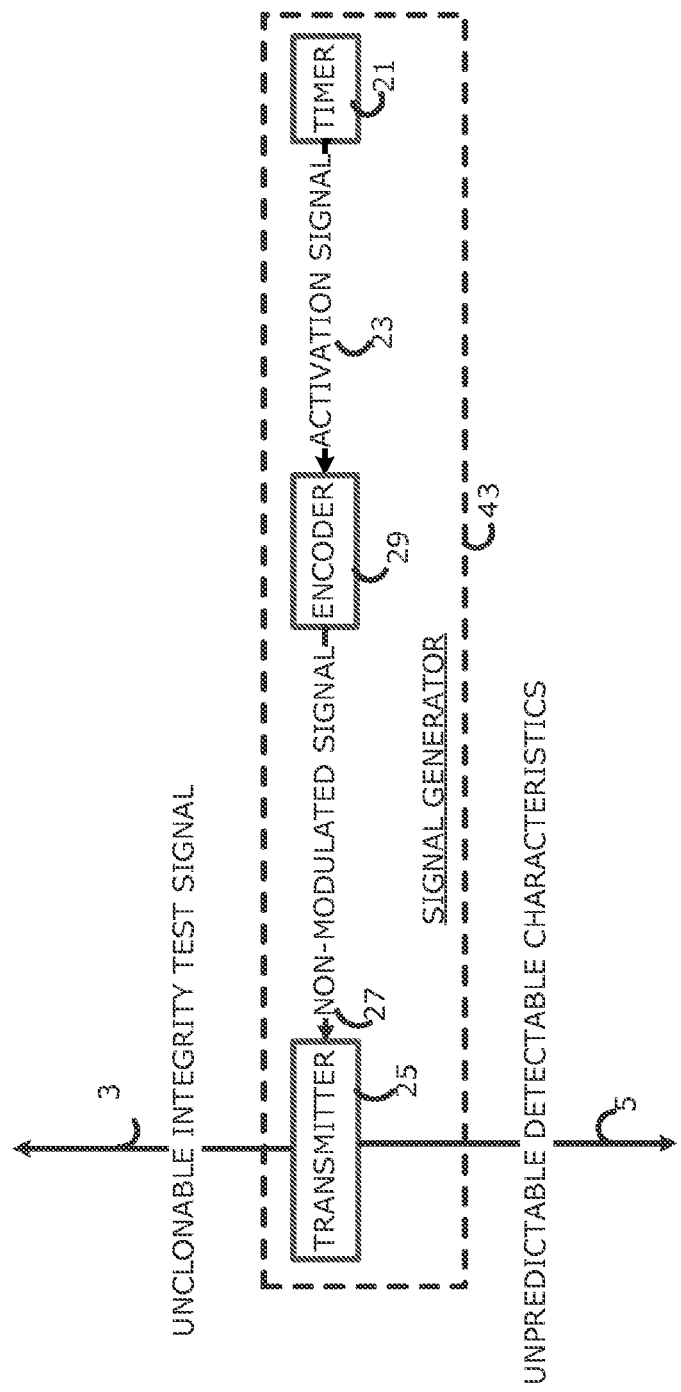
FIG. 2 is a detailed block diagram of a signal generator of the resilient antenna disturbance detector illustrated in FIG. 1.

Referring now to FIG. 2, there is illustrated an embodiment of the signal generator 43. A timer 21 provides an activation signal 23 to an encoder 29, which, in turn, generates a non-modulated signal 27 having the unpredictable detectable characteristics 5. A transmitter 25 modulates the non-modulated signal 27 into the unclonable integrity test signal 3 for radiation by the monitored antenna 7 (see FIG. 1).

The unpredictable detectable characteristics 5 can be any subset of a set of detectable characteristics that can be attributed to an oscillating radio frequency electric current, such as phase, frequency and amplitude, as long as the resulting false trigger delay prevents the reflected signal 9 (see FIG. 1) from reaching the comparator 11 before the unpredictable detectable characteristics 5 measured by the false trigger generator cease to be used by the comparator 11 to determine whether the reflected signal 9 matches the unclonable integrity test signal 3. The set includes, but is not limited to, an encoded binary sequence, a distinguishing frequency, a distinguishing energy level, and/or a distinct phase shift reversal common to any radio frequency reflection. Now referring to FIG. 2, in embodiments where the subset includes an encoded binary sequence, the encoder 29 comprises a binary modulator for encoding a binary sequence onto the integrity test signal 3, and with reference to FIG. 1 the comparator 11 comprises an RF detector including a binary demodulator for retrieving a binary sequence from the reflected signal 9. In determining whether the reflected signal 9 matches the unclonable integrity test signal 3 (or the copy 5 provided to the comparator 11), the comparator 11 verifies whether the retrieved binary sequence matches the encoded binary sequence.

Referring to FIGS. 1 and 2, in embodiments where the subset includes a distinguishing frequency, the encoder 29 comprises a frequency modulator for setting the frequency of the integrity test signal 3, and the comparator 11 has a frequency demodulator for determining the encoding of the reflected signal 9. In determining whether the reflected signal 9 matches the unclonable integrity test signal 3 (or its copy 5), the comparator 11 verifies whether the encoding of the reflected signal 9 matches that of the unclonable integrity test signal 3.

In embodiments where the subset includes a distinguishing phase, the encoder 29 can comprise a phase modulator for setting the phase of the integrity test signal 3, and the comparator 11, a phase demodulator for determining the encoding of the reflected signal 9. In determining whether the reflected signal 9 matches the unclonable integrity test signal 3 or 5, the comparator 11 verifies whether the encoding of the reflected signal 9 matches that of the unclonable integrity test signal 3 or 5.

In embodiments where the subset includes a distinguishing energy level, the encoder 29 comprises an energy level modulator for setting the energy level of the integrity test signal 3, and the comparator 11, an energy level demodulator for determining the encoding of the reflected signal 9. In determining whether the reflected signal 9 matches the unclonable integrity test signal 3 or 5, the comparator 11 verifies whether the encoding of the reflected signal 9 matches that of the unclonable integrity test signal 3.

A false trigger can be of a bounce back nature with a simple RF amplifier/repeater where no delay allows the system to detect whether it is from its own transmitter 25 or from an external source. In this case, measurement of the phase allows the true nature of the reflected signal 9 to be determined by the fact that any reflection induces a 180 degree phase shift which is unclonable with a bounce back system. This only applies to frequency and phase modulation which have a constant envelope modulation. In the case of amplitude modulation, the nature of the envelope immunizes it from a bounce back system because the unpredictable nature of the falling edge of each bit envelope is masked by the amplifier/repeater higher RF level.

It was also discovered that while antenna disturbance detection has a wide variety of applications, such detection is particularly useful for security systems having a control panel in wireless communication with at least one security sensor located within protected premises and, in some cases, a remote control or data entry keypad. In such systems, if the control panel antenna is subject to disturbance, no wireless communication can take place between the control panel and the aforementioned devices, thus preventing the security system from fulfilling its purpose and, in some cases, preventing remote access to the control panel.

An antenna disturbance detector for such security systems can be implemented by having a security sensor transmit a wireless heartbeat to be received by the monitored antenna 7, having a heartbeat monitor listen to the wireless heartbeats received by the monitored antenna 7, and having a scheduler for signaling a disturbance of the monitored antenna 7 when a predetermined number of consecutively scheduled heartbeats fail to be received by the monitored antenna 7. However, such a detector drains the battery life of the security sensor and can be falsely triggered by a sensor malfunction.

Alternatively an antenna disturbance detector that exclusively relies on the energy level of reflected signals can be implemented for such security systems, but such a detector, as mentioned previously, is vulnerable to false triggers. A robber can position any one of the false trigger generators described herein above within the range of the monitored antenna 7 to falsely trigger the detector in a repeated manner, thus encouraging the user of the security system to disable the detector. The robber can subsequently show up at the protected premises disguised as a security system technician and discretely compromise the integrity of the monitored antenna 7, thus leaving the premises vulnerable to robbery.

It is an object of the present invention to provide a security system with resilient antenna disturbance detection as well as a method of operating such a security system. Referring to FIG. 1, there is illustrated a security system that benefits from resilient antenna disturbance detection. A security sensor 31 located within protected premises transmits a wireless security signal 33 to be received by the monitored antenna 7 of a security system control panel 35. A data entry keypad 37 in wireless communication with the control panel 35 permits remote user interaction. The security system benefits from the resilient antenna disturbance detector described herein above, which provides the advantage of resilience to false triggers. It will be appreciated that while the components of the resilient antenna disturbance detector have been illustrated as integrated in the control panel 35, at least one of the components can be physically located elsewhere.

Referring back to FIG. 1, the signal generator 43 has been described as generating the unclonable integrity test signal 3, and the monitored antenna 7, as radiating a fraction of the energy of the unclonable integrity test signal 3 in the form of the electromagnetic waves 17 and reflecting another fraction of the energy in the form of the reflected signal 9, which is provided to the comparator 11 and the controller 13. While a directional coupler 19 can be used for directing the unclonable integrity test signal 3 and the reflected signal 9 to their intended destination, any circuitry capable of managing the traffic of electric signals in the same manner can be used.

Figure 3:
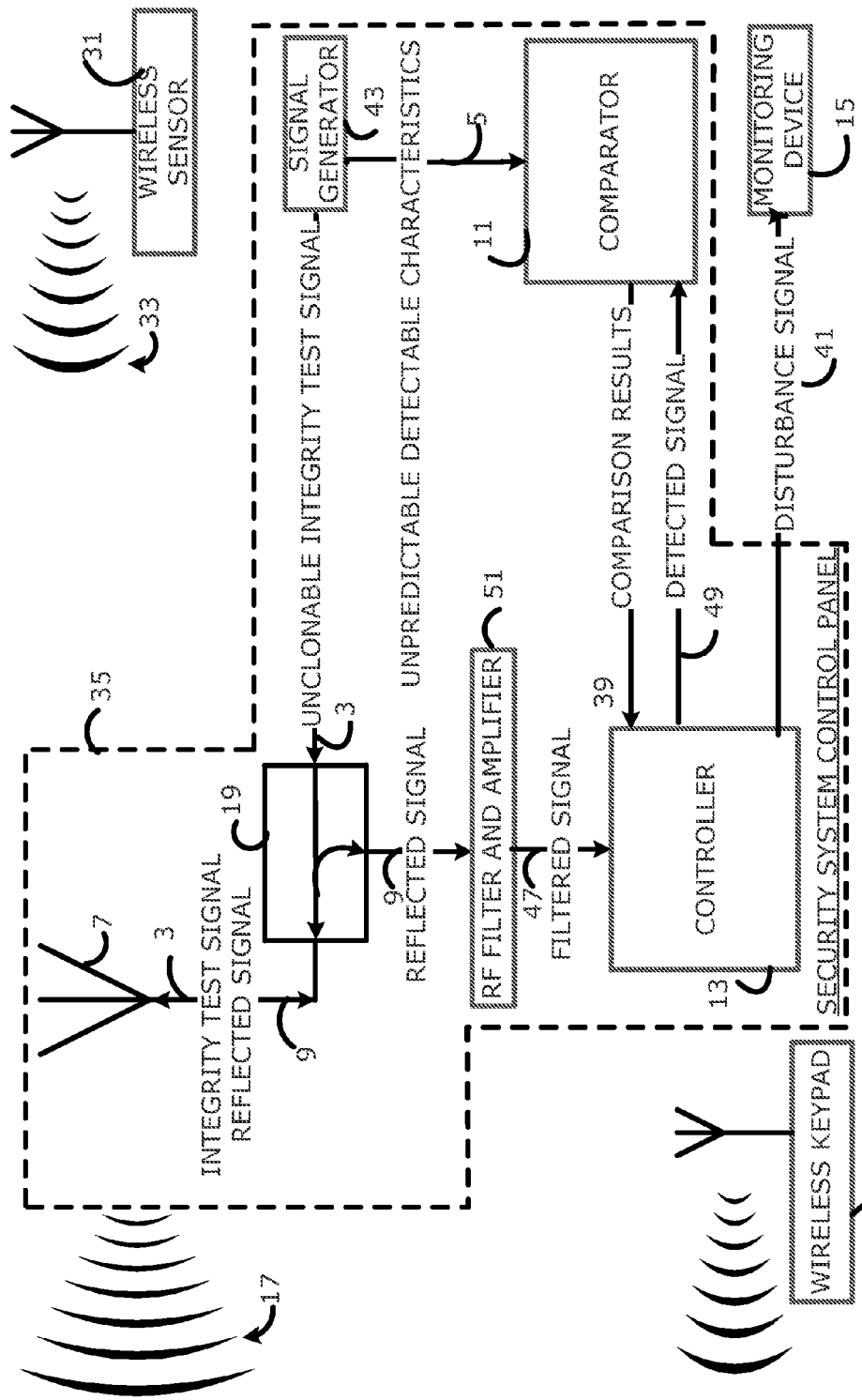
FIG. 3 is a block diagram of a resilient antenna disturbance detector according to a second embodiment of the invention

Referring now to FIG. 1, the monitored antenna 7 is described as providing the reflected signal 9 in response to the unclonable integrity test signal 3. Referring now to FIG. 3, it will be appreciated by the person skilled in the art of telecommunications that in environments where the monitored antenna 7 is susceptible of receiving noise that can interfere with the analysis of the reflected signal 9, a radio-frequency filter 51 can be strategically positioned to filter out the noise and provide a filtered signal 47 for unhindered analysis. It will also be appreciated by the person skilled in the art of telecommunications that a radio-frequency amplifier or a radio-frequency filter and amplifier can be used instead of the radio-frequency filter 51. It will also be appreciated by the person skilled in the art of telecommunications that if embodiments of the resilient antenna disturbance detector are susceptible of interfering with the regular operation of the monitored antenna, additional circuitry can be provided to eliminate, or at the very least reduce, the interference.

Still referring to FIG. 1, the monitored antenna 7 is described as providing the reflected signal 9 to the comparator 11 and the controller 13. While the monitored antenna 7 can transmit the reflected signal 9 to the comparator 11 and the controller 13, it can alternatively transmit the reflected signal 9 to one of the two components, which in turn can transmit the same to the other component. In one embodiment, shown in FIG. 3, the comparator 11 transmits the reflected signal 9 in the form of a detected signal to the controller 13 only if a match is found with the unclonable integrity test signal 3. In another embodiment, the controller 13 transmits the reflected signal 9 to the comparator 11 only if the energy level of the reflected signal 9 is greater than the predetermined threshold.

Still referring to FIG. 1, the comparator 11 has been described as determining whether the reflected signal 9 matches the unclonable integrity test signal 3. In one embodiment, a match can only be found if the detectable characteristics of the reflected signal 9 are identical to the unpredictable detectable characteristics 5. In another embodiment, a match can only be found if the detectable characteristics of the reflected signal 9 are within a predetermined margin of error of the unpredictable detectable characteristics 5. It will be appreciated by the person skilled in the art of telecommunications that in the latter embodiment, the margin of error can be predetermined as a function of the nature of the unpredictable detectable characteristics 5. Also, with reference to FIG. 1 and FIG. 2, while the unpredictable detectable characteristics 5 can be transmitted to the comparator 11 by the encoder 29, they can alternatively be retrieved by the comparator 11 from a transmitted copy of the unclonable integrity test signal 3.

Still referring to FIG. 1, the controller 13 has been described as signaling a disturbance of the monitored antenna 7 to the monitoring device 15. For instance, it can signal the disturbance by providing a data signal indicative of the disturbance in the form of a disturbance signal 41, by providing a control signal that switches the monitoring device 15 to a disturbed state, or by withholding a scheduled transmission of a heartbeat signal to the monitoring device 15. As for the monitoring device 15, it can be any device capable of relaying the information to a person of interest. For instance, it can be an alarm that relays the information by emitting distinctive sound signals. Alternatively, it can be the control panel 35 and relay the information by displaying a distinctive visual indicator on a LED screen.

What is claimed is:

1. An antenna disturbance detector for signaling a disturbance of an RF communication antenna to a monitoring device, said antenna for internally reflecting a signal in response to an unclonable integrity test signal having unpredictable detectable characteristics, said antenna disturbance detector comprising:
    a signal generator for generating said unclonable integrity test signal;
    said antenna being configured to simultaneously receive an external signal, said received external signal being added into said reflected signal;
    a comparator for determining whether said reflected signal including said received external signal matches said integrity test signal; and
    a controller for signaling said disturbance of said antenna to said monitoring device if the energy level of said reflected signal is greater than a predetermined threshold and said comparator determines that said reflected signal matches said unclonable integrity test signal.

2. The antenna disturbance detector of claim 1 wherein said signal generator comprises an energy encoder for setting the energy level of said unclonable integrity test signal, said unpredictable detectable characteristics comprises said energy level, said comparator comprises an energy decoder for determining the energy level of said reflected signal, and said comparator determines that said reflected signal matches said unclonable integrity test signal if said energy level of said reflected signal matches said energy level of said unclonable integrity test signal.

3. The antenna disturbance detector of claim 1 wherein said signal generator comprises a frequency encoder for setting the frequency of said integrity test signal, said unpredictable detectable characteristics comprises said frequency, said comparator comprises a frequency decoder for determining the frequency of said reflected signal, and said comparator determines that said reflected signal matches said unclonable integrity test signal if said frequency of said reflected signal matches said frequency of said unclonable integrity test signal.

4. The antenna disturbance detector of claim 1 wherein said signal generator comprises an amplitude encoder for setting the amplitude of said unclonable integrity test signal, said unpredictable detectable characteristics comprises said amplitude, said comparator comprises an amplitude decoder for determining the amplitude of said reflected signal, and said comparator determines that said reflected signal matches said unclonable integrity test signal if said amplitude of said reflected signal matches said amplitude of said unclonable integrity test signal.

5. The antenna disturbance detector of claim 1, wherein said monitoring device is a security system control panel and said monitoring device switches to one of: an alarm state, and a trouble state, upon said controller signaling said disturbance of said antenna.

6. A security system control panel having a wireless transceiver and an antenna for RF communication with at least one wireless security system intrusion detector, the control panel having an antenna disturbance detector as defined in claim 1 for detecting disturbance of said antenna and acting as a monitoring device configured to trigger one of: an alarm state, and a trouble state when a disturbance of said antenna is detected.

7. A security system control panel having a wireless transceiver and an antenna for RF communication with at least one wireless security system intrusion detector, the control panel having an antenna disturbance detector as defined in claim 2 for detecting disturbance of said antenna and acting as a monitoring device configured to trigger a trouble state when a disturbance of said antenna is detected.

8. A security system control panel having a wireless transceiver and an antenna for RF communication with at least one wireless security system intrusion detector, the control panel having an antenna disturbance detector as defined in claim 3 for detecting disturbance of said antenna and acting as a monitoring device configured to trigger a trouble state when a disturbance of said antenna is detected.

9. A security system control panel having a wireless transceiver and an antenna for RF communication with at least one wireless security system intrusion detector, the control panel having an antenna disturbance detector as defined in claim 4 for detecting disturbance of said antenna and acting as a monitoring device configured to trigger a trouble state when a disturbance of said antenna is detected.

10. An antenna disturbance detector for signaling a disturbance of an antenna to a monitoring device, said antenna for reflecting a signal in response to an unclonable integrity test signal having unpredictable detectable characteristics, said antenna disturbance detector comprising:
    a signal generator for generating said unclonable integrity test signal, said signal generator including a binary encoder for encoding a binary sequence onto said unclonable integrity test signal, said unpredictable detectable characteristics comprise said binary sequence;
    a comparator for determining whether said reflected signal matches said integrity test signal, said comparator including a binary decoder for retrieving a binary sequence from said reflected signal, said comparator being configured to determine that said reflected signal matches said unclonable integrity test signal if said retrieved binary sequence matches said encoded binary sequence; and a controller for signaling said disturbance of said antenna to said monitoring device if the energy level of said reflected signal is greater than a predetermined threshold and said comparator determines that said reflected signal matches said unclonable integrity test signal.

11. A security system control panel having a wireless transceiver and an antenna for RF communication with at least one wireless security system intrusion detector, the control panel having an antenna disturbance detector as defined in claim 10 for detecting disturbance of said antenna and acting as a monitoring device configured to trigger a trouble state when a disturbance of said antenna is detected.

12. The antenna disturbance detector of claim 10, wherein said signal generator comprises an energy encoder for setting an energy level of said unclonable integrity test signal, said unpredictable detectable characteristics comprise said energy level, said comparator comprises an energy decoder for determining an energy level of said reflected signal, and said comparator determines that said reflected signal matches said unclonable integrity test signal if said energy level of said reflected signal matches said energy level of said unclonable integrity test signal.

13. The antenna disturbance detector of claim 10, wherein said signal generator comprises a frequency encoder for setting a frequency of said unclonable integrity test signal, said unpredictable detectable characteristics comprise said frequency, said comparator comprises a frequency decoder for determining a frequency of said reflected signal, and said comparator determines that said reflected signal matches said unclonable integrity test signal if said frequency of said reflected signal matches said frequency of said unclonable integrity test signal.

14. The antenna disturbance detector of claim 10, wherein said signal generator comprises an amplitude encoder for setting an amplitude of said unclonable integrity test signal, said unpredictable detectable characteristics comprise said amplitude, said comparator comprises an amplitude decoder for determining an amplitude of said reflected signal, and said comparator determines that said reflected signal matches said unclonable integrity test signal if said amplitude of said reflected signal matches said amplitude of said unclonable integrity test signal.

15. The antenna disturbance detector of claim 10, wherein said monitoring device comprises a security system control panel and said monitoring device switches to a trouble state upon said controller signaling said disturbance of said antenna.

16. A security system control panel having a wireless transceiver and an antenna for RF communication with at least one wireless security system intrusion detector, the control panel having an antenna disturbance detector as defined in claim 12 for detecting disturbance of said antenna and acting as a monitoring device configured to trigger a trouble state when a disturbance of said antenna is detected.

17. A security system control panel having a wireless transceiver and an antenna for RF communication with at least one wireless security system intrusion detector, the control panel having an antenna disturbance detector as defined in claim 13 for detecting disturbance of said antenna and acting as a monitoring device configured to trigger a trouble state when a disturbance of said antenna is detected.

18. A security system control panel having a wireless transceiver and an antenna for RF communication with at least one wireless security system intrusion detector, the control panel having an antenna disturbance detector as defined in claim 14 for detecting disturbance of said antenna and acting as a monitoring device configured to trigger a trouble state when a disturbance of said antenna is detected.

* * * * *